United States Patent
Vincent et al.

(10) Patent No.: US 10,020,153 B2
(45) Date of Patent: Jul. 10, 2018

(54) METHOD FOR DETERMINING A CAUSE OF A VOLTAGE OUTAGE LOAD-SIDE FROM A CIRCUIT BREAKER, AUXILIARY UNIT FOR A CIRCUIT BREAKER, ELECTRIC SYSTEM COMPRISING A CIRCUIT BREAKER AND ONE SUCH AUXILIARY UNIT

(71) Applicant: SCHNEIDER ELECTRIC INDUSTRIES SAS, Rueil-Malmaison (FR)

(72) Inventors: Francois Vincent, Le Cheylas (FR); Simon Tian, Eybens (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 238 days.

(21) Appl. No.: 14/483,714

(22) Filed: Sep. 11, 2014

(65) Prior Publication Data
US 2015/0070026 A1    Mar. 12, 2015

(30) Foreign Application Priority Data

Sep. 12, 2013  (FR) ...................................... 13 58776

(51) Int. Cl.
*G08B 21/00* (2006.01)
*H01H 71/12* (2006.01)
(Continued)

(52) U.S. Cl.
CPC .......... *H01H 71/125* (2013.01); *H01H 71/04* (2013.01); *H01H 71/462* (2013.01);
(Continued)

(58) Field of Classification Search
CPC .... H01H 71/125; H01H 71/04; H01H 71/462; H01H 2071/048; H01H 2071/042;
(Continued)

(56) References Cited

U.S. PATENT DOCUMENTS

| 6,459,363 B1 | 10/2002 | Walker et al. |
| 2008/0136567 A1 | 6/2008 | Chelloug |

(Continued)

FOREIGN PATENT DOCUMENTS

| EP | 1 755 135 A2 | 2/2007 | |
| EP | 2267465 A1 * | 12/2010 | ............. H02H 3/042 |
| EP | 2 355 121 A2 | 8/2011 | |
| WO | 99/46868 | 9/1999 | |

OTHER PUBLICATIONS

Simon et al, EP 2267465, "Device and method for indicating electrical faults, assembly and electric board comprising such a device", English Machine Translation, Published Dec. 29, 2010.*

(Continued)

*Primary Examiner* — Farhana Hoque
(74) *Attorney, Agent, or Firm* — Oblon, McClelland, Maier & Neustadt, L.L.P.

(57) ABSTRACT

In this method, the voltage outage load-side is an opening of the circuit breaker, and the circuit breaker is able to interrupt the flow of electric current in an electric connection including an electric conductor. The auxiliary unit comprises a current sensor for measuring the intensity of the current flowing in the electric conductor and a first detection means for detecting the voltage outage load-side from the circuit breaker. The method comprises the following steps: measuring the intensity of the current flowing in the electric conductor, detecting the voltage outage load-side from the electric circuit breaker, determining a cause of the detected voltage outage load-side from the circuit breaker, said cause being selected from the group consisting in: an electric overload, a short-circuit and a voltage drop.

10 Claims, 6 Drawing Sheets

(51) Int. Cl.
*H01H 71/04* (2006.01)
*H01H 71/46* (2006.01)
*H02H 3/38* (2006.01)
*H02H 3/08* (2006.01)
*H02H 3/10* (2006.01)
*H02H 3/24* (2006.01)
*H02H 5/04* (2006.01)

(52) U.S. Cl.
CPC .............. *H02H 3/08* (2013.01); *H02H 3/10* (2013.01); *H02H 3/24* (2013.01); *H02H 3/38* (2013.01); *H02H 5/041* (2013.01); *H01H 2071/042* (2013.01); *H01H 2071/048* (2013.01)

(58) Field of Classification Search
CPC ............ H02H 5/041; H02H 3/24; H02H 3/10; H02H 3/08; H02H 3/38
See application file for complete search history.

(56) References Cited

U.S. PATENT DOCUMENTS

| | | | |
|---|---|---|---|
| 2010/0019913 A1* | 1/2010 | Rodseth | H01H 85/32 340/638 |
| 2010/0149711 A1* | 6/2010 | Larson | H01H 71/04 340/635 |
| 2011/0181379 A1 | 7/2011 | Sohn | |
| 2012/0086425 A1* | 4/2012 | Suchoff | G01R 15/04 323/311 |

OTHER PUBLICATIONS

French Preliminary Search Report dated May 15, 2014, in Patent Application No. FR 1358776, filed Sep. 12, 2013 (with English Translation of Category of Cited Documents).

* cited by examiner

METHOD FOR DETERMINING A CAUSE OF A VOLTAGE OUTAGE LOAD-SIDE FROM A CIRCUIT BREAKER, AUXILIARY UNIT FOR A CIRCUIT BREAKER, ELECTRIC SYSTEM COMPRISING A CIRCUIT BREAKER AND ONE SUCH AUXILIARY UNIT

BACKGROUND OF THE INVENTION

The present invention relates to a method for determining a cause of a voltage outage load side from a circuit breaker by means of an auxiliary unit, through the absence of voltage downstream from the circuit breaker corresponding to an opening of the circuit breaker or to a drop in voltage at the input of the circuit breaker below a first reference voltage value.

The present invention also relates to an auxiliary unit for an electric circuit breaker, the circuit breaker being, in an open position, capable of interrupting the flow of an electric current in an electric connection comprising at least one electric conductor.

The present invention also relates to an electric system comprising an electric circuit breaker and such an auxiliary unit coupled with the electric circuit breaker.

A persisting challenge in the field of circuit breakers is to identify, following the opening of the circuit breaker, the type of fault having caused this opening.

The use of an auxiliary signalling module for a circuit breaker comprising a first switch indicating the closed or open state of the contacts of the circuit breaker and a second switch indicating the armed or triggered state of the circuit breaker is thus known from EP-A1-1065691. Thus, once the auxiliary module is coupled with the circuit breaker, the switches are able to interfere with the mechanism of the circuit breaker and to be moved depending on the state of the circuit breaker. Such an auxiliary module therefore gives the possibility of knowing whether the circuit breaker is open following manual actuation of the opening of the circuit breaker, the state of the circuit breaker then also being called an open state, or else following the presence of a fault, such as an electric overload on the electric connection, having caused the triggering of the circuit breaker, the state of the circuit breaker also being called a triggered-on-fault state. When the circuit breaker is in the closed position, the state of the circuit breaker is also called a closed state.

However, such an auxiliary module for a circuit breaker gives the possibility of only knowing the state of the circuit breaker from among the open, closed or triggered-on-fault states and does not give the possibility of specifically knowing a cause of the triggering of the electric circuit breaker, i.e. a cause of the triggered state of the circuit breaker.

SUMMARY OF THE INVENTION

The object of the invention is therefore to propose an auxiliary unit for an electric circuit breaker and an associated method allowing optimum monitoring of the electric circuit breaker and notably the determination of the cause of an opening of the electric circuit breaker with which the auxiliary unit is coupled.

For this purpose, the object of the invention is a method for determining a cause of a voltage outage load-side from a circuit breaker by means of an auxiliary unit, the voltage outage load-side from the circuit breaker corresponding to an opening of the circuit breaker or to a voltage drop at the input of the circuit breaker below a first reference voltage value, the circuit breaker being, in the open position, able to interrupt the flow of an electric current in an electric connection including at least one electric conductor, the auxiliary unit comprising at least one current sensor able to measure the intensity of the current flowing in a respective electric conductor and a first detection means able to detect the voltage outage load-side from the circuit breaker, the method comprising the following steps:
  a) measuring, with said or each current sensor, the intensity of the current flowing in said or each electric conductor,
  b) detecting, via the first detection means, the voltage drop downstream from the circuit breaker.

According to the invention, the method further comprises the following step:
  c) determining with the auxiliary unit and depending on the intensity measured by said or each current sensor, a cause of the detected voltage drop, said cause being preferably selected from the group consisting in: an electric overload, a short-circuit, and a voltage drop.

By means of the invention, the auxiliary unit is able to specifically diagnostic the cause of the voltage drop downstream from the circuit breaker depending on the measurement of the current flowing in said or each corresponding electric conductor. Thus, by measuring the current, the determination device is for example capable of determining whether the voltage drop downstream from the circuit breaker is due to a voltage drop or to a short-circuit or further to an overload current.

According to different aspects of the invention, the method for determining a cause of the voltage drop downstream from the circuit breaker comprises one or more of the following features, taken individually or according to all the technically acceptable combinations:
  following the measurement step a) and preceding the detection step b), the auxiliary unit carries out the following step:
    a2) calculating, depending on the values of intensity measured in step a), a heating-up of one or second means for detecting an electric overload, the second detection means being comprised in the circuit breaker;
  following step a2) the auxiliary unit carries out the following steps:
    a3) the comparison of the heating-up value calculated with a first threshold value, and
    a4) generating an alarm signal when the calculated value of the heating-up is greater than the first threshold value;
  following step a2) the auxiliary unit carries out the following steps:
    a3') the comparison of the calculated value of the heating-up with a first threshold value and with a second threshold value, less than the first threshold value, and
    a4') generating an alarm signal from the moment when the calculated value of heating-up is greater than the first threshold value and as long as the calculated value of the heating-up is greater than the second threshold value;
  following the detection step b), if the voltage drop load-side from the circuit breaker was detected by the first detection means, the auxiliary unit carries out during the determination step c), the following step:
    c1) the comparison of the calculated value of the heating-up with a third threshold value in order to detect a first cause of the voltage outage load-side from the circuit breaker, the third threshold value being greater than the first threshold value;

following the measurement step a) and preceding the detection step b), the auxiliary unit carries out the following step:

a5) calculating a maximum value of the intensities measured during a predetermined lapse of time;

following the detection step b), if the voltage outage load-side from the circuit breaker was detected by the first detection means, the auxiliary unit carries out during the determination step c) the following step:

c2) the comparison of the maximum value of the current with a fourth threshold value, in order to detect a second cause of the voltage outage load-side from the circuit breaker;

following the determination step c), the auxiliary unit carries out the following step:

d) the transmission of a message containing a first datum corresponding to the presence of voltage load-side from the circuit breaker and a second datum corresponding to the cause of the voltage outage load-side from the circuit breaker, to a concentrator.

The object of the invention is also an auxiliary unit for an electric circuit breaker, the circuit breaker being, in the open position, able to interrupt the flow of electric current in an electric connection including at least one electric conductor, the auxiliary unit comprising at least one current sensor able to measure the intensity of the current circulating in a respective electric conductor and a first detection means able to detect a voltage outage load-side from the circuit breaker, the voltage outage load-side from the circuit breaker corresponding to an opening of the circuit breaker or to a voltage drop at the input of the circuit breaker below a first reference voltage value. According to the invention, the auxiliary unit comprises a device for determining a cause of the voltage outage load-side from the circuit breaker, depending on the intensity measured by said or each current sensor, said cause being preferably selected from the group consisting in: an electric overload, a short-circuit and a voltage drop.

According to other advantageous aspects of the invention, the auxiliary unit comprises one or several of the following features, taken individually or according to all the technically acceptable combinations:

the circuit breaker includes an input terminal for the current and an output terminal for the current for each electric conductor, while the first detection means comprises at least one voltage sensor able to measure the voltage delivered to a respective output terminal of the circuit breaker, and while the first detection means is able to detect the voltage outage load-side from the circuit breaker if the voltage measured by the voltage sensor is less than a second reference voltage value during a predetermined time interval;

the circuit breaker includes an input terminal for the current and an output terminal for the current for each electric conductor, while the first detection means comprises at least one voltage sensor able to measure the voltage delivered to a respective output terminal of the circuit breaker, and while the first detection means is able to calculate a derivative of the measured voltage and to detect the voltage outage load-side from the circuit breaker if the derivative calculated by the first detection means is less than a reference value for a predetermined reference time.

the circuit breaker comprises at least one second detection means able to detect an electric overload, while the auxiliary unit comprises a first calculation means able to calculate a heating-up of said or each second detection means, depending on the intensity measured by said or each current sensor, the determination device being able to determine the cause of the voltage outage load-side from the circuit breaker depending on said calculated heating-up;

the auxiliary unit comprises a second calculation means able to calculate a maximum value of the intensities measured during a predetermined lapse of time, the determination device being able to determine the cause of the voltage outage load-side from the circuit breaker depending on the maximum value of the measured intensities;

the auxiliary unit comprises a third calculation means able to calculate an electric power and an electric energy crossing each corresponding conductor from the intensity and voltage values respectively measured by said or each current sensor and said or each voltage sensor, while the auxiliary unit comprises a communication member able to transmit the measured intensity and voltage values and the calculated energy and power values to a concentrator.

The object of the invention is also an electric system comprising an electric circuit breaker and an auxiliary unit electrically coupled with the electric circuit breaker, the electric circuit breaker being, in an open position, able to interrupt the flow of electric current in an electric connection including at least one electric conductor. According to the invention, the auxiliary unit is compliant with the auxiliary unit shown above.

DESCRIPTION OF THE DRAWINGS

The invention will be better understood and other advantages thereof will become more clearly apparent in the light of the description which follows, only given as a non-limiting example, and made with reference to the appended drawings wherein.

DESCRIPTION OF EMBODIMENTS OF THE INVENTION

Figure 1:
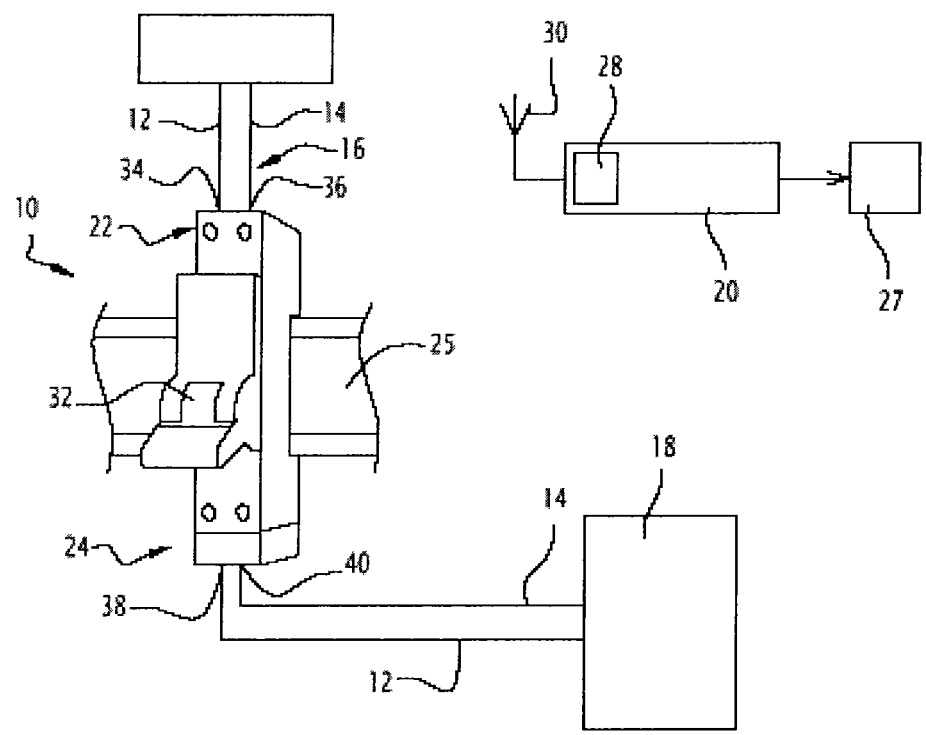
FIG. 1 is a schematic illustration of an electric system according to a first embodiment of the invention comprising an electric circuit breaker and an auxiliary unit electrically coupled with said circuit breaker.

In FIG. 1, an electric system 10 is connected to a first electric conductor 12 and to a second electric conductor 14, the conductors 12, 14 belonging to an electric power distribution network 16 and being intended for powering an electric load 18.

The electric system 10 is able to communicate through a wireless connection with a data concentrator 20.

The electric system 10 comprises an electric circuit breaker 22, such as an electromechanical circuit breaker, preferably a magnetothermal circuit breaker, and an auxiliary unit 24 electrically coupled with the circuit breaker 22. The auxiliary unit 24 is, for example, attached under the circuit breaker 22.

The electric system 10 comprises a rail 25 on which is mechanically attached the circuit breaker 22.

The first conductor 12 is for example a phase conductor or further a positive DC potential conductor.

The second conductor 14 is for example a neutral conductor or further a reference DC potential conductor.

The first conductor 12 and the second conductor 14 form an electric connection 16.

The data concentrator 20 is connected, via a data connection, such as a radioelectric link, to a viewing device 27, in order to notably display the information relating to the operation of the circuit breaker 22 transmitted by the auxiliary unit 24. The concentrator 20 comprises a first communication member 28 and a first radioelectric antenna 30.

The electric circuit breaker 22 is known per se, and is able to interrupt the flow of an electric current crossing the first conductor 12 and/or the second conductor 14 notably in the presence of an electric fault on the first conductor 12 or the second conductor 14.

The circuit breaker 22 includes a mechanical output member 32, visible in FIG. 1, the mechanical output member 32 being movable between an operational position and a stopping position corresponding to the interruption of the flow of the current in the conductors 12 and 14, after opening the circuit breaker 22. The mechanical output member 32 is movably mounted towards the stopping position in the case of an overload on the first or second conductors 12, 14 or on manually opening the electric circuit breaker 22.

The circuit breaker 22 comprises at least one detection means, not illustrated, such as a bi-metal switch, able to detect an electric overload on the first conductor 12 or on the second conductor 14, and also called a means for detecting an overload.

The electric circuit breaker 22 is for example a magnetothermal circuit breaker able to interrupt the flow of the current in the first and/or second conductors 12, 14, by a thermal effect, in the case of an overload, and by a magnetic effect in the case of a short-circuit.

The circuit breaker 22 includes first 34 and second 36 input terminals for the current and first 38 and second 40 output terminals for the current, the first input and output terminals 34, 38 being associated with the first electric conductor 12 and the second input and output terminals 36, 40 being associated with the second electric conductor 14.

The circuit breaker 22 is in an open position able to interrupt the flow of an electric current I through the electric connection 16. More generally, the voltage outage load-side from the circuit breaker 22 occurs, when it is in the open position or as a result of a voltage drop at the input of the circuit breaker 22 below a first reference voltage value. The first reference voltage value is for example comprised between 0 Volts and 50 Volts. The presence of a voltage load-side from the circuit breaker 22 results from the closed position of the circuit breaker, i.e. said circuit breaker is able to allow a current flow through the electric connection 16, and the voltage at the input of the circuit breaker is greater than the first reference voltage.

The auxiliary unit 24 comprises a current sensor 44, a voltage sensor 46, a processing unit 48, an electric power supply member 50, a voltage regulator 51, an electric energy storage member 52, a second communication member 53 and a second radioelectric antenna 54.

Additionally, in the case of an alternating current, the auxiliary unit 24 comprises a differential current sensor, not shown, able to measure a differential current between the first conductor 12 and the second conductor 14.

The viewing device 27 notably includes a display screen, not shown, and means, not shown, for displaying on the screen, data received from the data concentrator 20.

The first communication member 28 is able to transmit data to the auxiliary unit 24 via the first antenna 30 and to establish a radioelectric link with the auxiliary unit 24.

The mechanical output member 32 is known per se, and is also called a lever 32 for resetting the circuit breaker 22.

The resetting lever 32 is movable between its operational position corresponding to the closed state of the circuit breaker 22 and its stopping position corresponding to the open state of the circuit breaker 22 in the case of manually actuating the lever 32, or further to the triggered state of the circuit breaker 22 in the case of an overload or short-circuit in the first 12 and/or second 14 conductors.

The resetting lever 32 gives the possibility of resetting the circuit breaker 22 after a trigger, i.e. causing the circuit breaker 22 to pass from its open or triggered state to its closed state, in order to again allow the current to flow in the first 12 and second 14 conductors. The lever 32 also allows the circuit breaker 22 to be opened manually.

Figure 2:
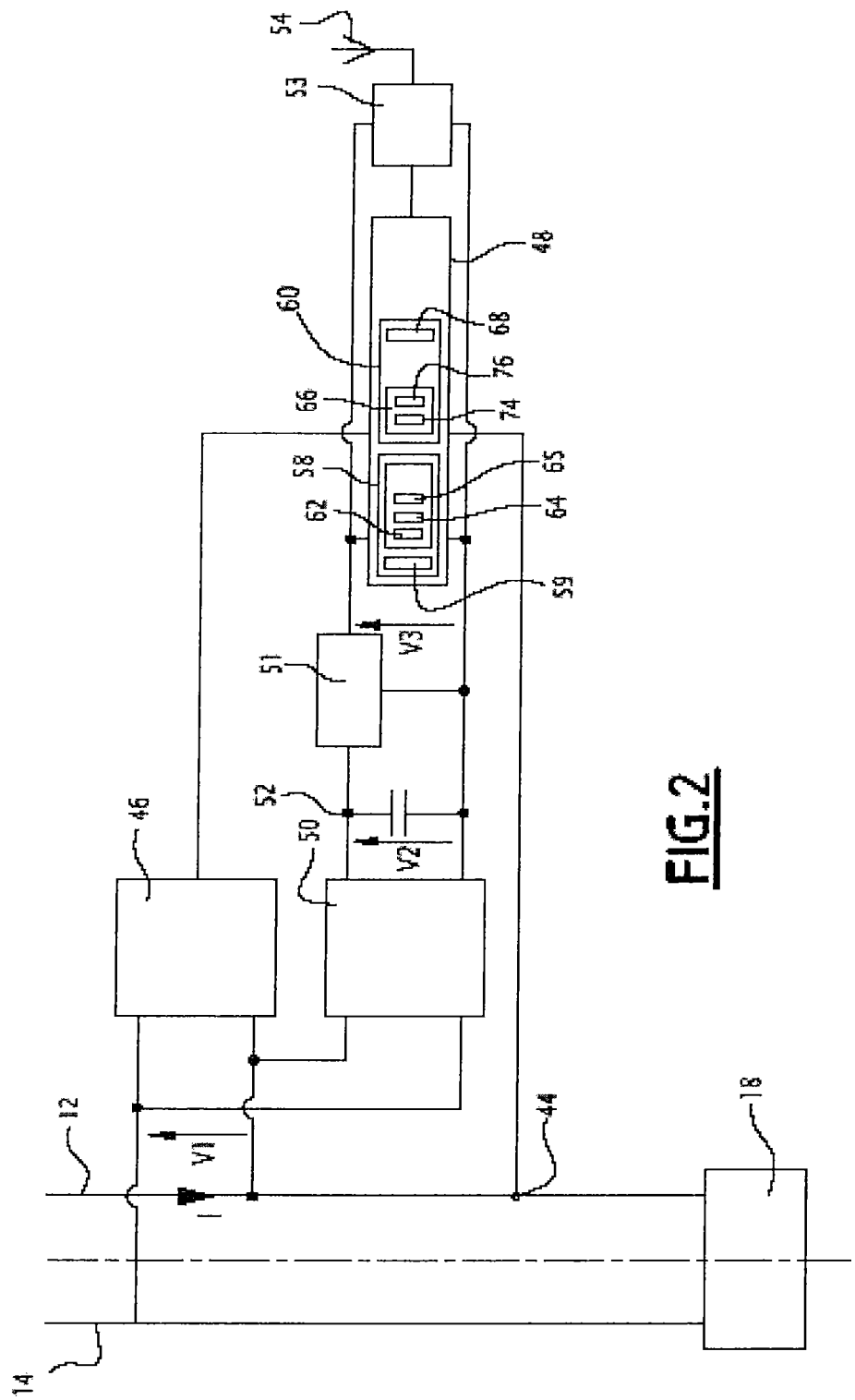
FIG. 2 is a very schematic illustration of the auxiliary unit of FIG. 1.

The current sensor 44, visible in FIG. 2, is known per se, and is able to measure the intensity of the current I flowing in the first electric conductor 12. The current sensor 44 is for example a phase current sensor, and then includes for example a Rogowski torus, a shunt or even a Hall effect sensor. In the following of the description, the current and the intensity of the current bear the same reference I.

Additionally, the auxiliary unit 24 comprises a second current sensor, not shown, able to measure the intensity of the current flowing in the second electric conductor 14.

The voltage sensor 46 is known per se, and is able to measure a first voltage V1 delivered between the first output terminal 38 and the second output terminal 40. The voltage sensor 46 more specifically allows measurement of the first output voltage V1 of the circuit breaker 22, at the first electric conductor 12.

The processing unit 48 includes a processor 58, a detection means 59 capable of detecting the voltage outage load-side from the circuit breaker 22, and also called a means 59 for detecting the voltage outage load-side from the circuit breaker 22, and a memory 60 associated with the processor 58, as illustrated in FIG. 2.

The detection means 59 for the voltage outage load-side from the circuit breaker 22 and the means for detecting an overload are respectively called first detection means 59 and second detection means subsequently.

The electric power supply member 50 is able to recover a portion of the electric energy transmitted over the electric conductors 12, 14 and to supply electric power to the auxiliary unit 24.

The voltage regulator 51 gives the possibility of adapting the voltage delivered by the electric power supply 50 to a voltage value acceptable by the processing unit 48 and the communication member 53. The regulator 51 is for example a DC-DC converter which delivers a DC voltage of 3.3V.

The electric energy storage member 52 is able to store a portion of the electric energy delivered by the power supply 50 when the circuit breaker 22 is closed, and of giving back the stored electric energy after the voltage outage load-side from the circuit breaker 22.

In FIG. 2, the storage member 52 is a capacitor, the capacitance value of which depends, inter alia, on the average electric consumption of the auxiliary unit 24 and on the power supply voltage to be delivered to the second communication member 53 and to the processing unit 48.

The second communication member 53 is able to receive data from the data concentrator 20, and more specifically from the first communication member 28 and from the first antenna 30, and to establish a radioelectric link with the concentrator 20. The second communication member 53 is able to generate a message M1 comprising data from the processing unit 48, and then to transmit via the second antenna 54, the message M1 intended for the data concentrator 20.

Advantageously, the communication members 28, 53 and the antennas 30, 54 are compliant with the ZIGBEE or ZIGBEE GREEN POWER communication protocol, based on the IEEE-802.15.4 standard.

Alternatively, the communication member 53 is able to communicate with the data concentrator 20 via a wired link, not shown.

The second radioelectric antenna 54 is able to transmit and to receive information to and from the first radioelectric antenna 30.

The processor 58 comprises a first software package 62 for calculating a heating-up value θ of the second detection means, depending on the intensity of the current I measured by the current sensor 44. The processor 58 also comprises a second software package 64 for calculating a maximum value $I_{max}$ of the measured intensities, also called the maximum intensity $I_{max}$, for a predetermined lapse of time T1.

The processor 58 comprises a first software 65 package for comparing the heating-up value θ with a first threshold value S1.

Additionally, the first comparison software package 65 is capable of comparing the heating-up value θ with the first threshold value S1 on the one hand, a second threshold value S2 below the first threshold value S1 on the other hand. The first threshold value S1 is parameterized in order to correspond to the heating-up θ of the second detection means when it is crossed by a current comprised between 60% and 90% of the rated current of the circuit breaker 22, while the second threshold value S2 is comprised between 80% and 95% of the first threshold value S1.

The first detection means 59 is able to detect the voltage outage load-side from the circuit breaker 22 if the first voltage V1, measured by the voltage sensor 46, is less than a second reference voltage value Vref during a predetermined time interval T2. The second reference voltage value Vref is for example less than 20% of the rated voltage of the mains 16.

Alternatively, the first detection means 59 is able to measure the ripple of the voltage measured by the voltage sensor 46. In order to measure the ripple, the first detection means 59 is capable of calculating a derivative of the measured voltage. Thus, if the derivative, expressed in volts per milliseconds (V/ms), calculated by the first detection means 59 is less than a reference value, for example comprised between 1% and 10% of the rated voltage of the circuit breakers 22, i.e. between 2.3V/ms and 23V/ms for a rated voltage of 230V, during a predetermined reference period T3, the first detection means is able to detect the voltage outage load-side from the circuit breaker 22. The reference period T3 is preferably comprised between 5 ms and 20 ms.

The memory 60 is capable of storing an application 66 for determining the cause of the voltage outage load-side from the circuit breaker, detected according to the intensity measured by the current sensor 44. The memory 60 is also able to store a software package 68 for sampling the intensity of the current I measured by the current sensor 44, and of the first voltage V1 measured by the voltage sensor 46. The memory 60 is also able to store samples of the intensity of the current I measured by the current sensor 44 and also of the first voltage V1 measured by the voltage sensor 46, as well as electric power and energy values calculated via the processor 58 from the measured intensity I and first voltage V1 values.

The determination application 66 is able to determine the cause of the voltage outage load-side from the circuit breaker detected by the first detection means 59 according to the intensity of the current I measured by the current sensor 44. The determination application 66 comprises a second software package 74 for comparing the heating-up value θ calculated with a third threshold value S3 and a third software package 76 for comparing the maximum value $I_{max}$ of the intensities measured with a fourth threshold value S4. The third threshold value S3 is set to a heating-up value θ corresponding to a current comprised between 100% and 120% of the rated current of the circuit breaker 22, while the fourth threshold value S4 is comprised between 3 and 10 times the rated current of the circuit breaker 22.

Alternatively, the determination application 66 also comprises a third software package, not shown, for calculating a duration during which the calculated heating-up value θ is greater than the third threshold value S3. In this alternative, the determination application 66 comprises a fourth comparison software package, not shown. The fourth comparison software package is able to compare the duration calculated by the third calculation software package with a reference duration.

Additionally, the determination application 66 includes a software package, not shown, for providing dates and times of the overshoot(s) of the third S3 and fourth S4 threshold values by the heating-up value θ and the maximum value $I_{max}$ of the measured intensities respectively.

The second comparison software package 74 is able to compare the heating-up value θ with a third threshold value S3 in order to determine a first cause of the voltage outage load-side from the circuit breaker 22. More specifically, the first cause of the voltage outage load-side from the circuit breaker 22 corresponds to an electric overload, and is detected if the heating-up value θ is greater than the third threshold value S3.

The third comparison software package 76 is able to compare the maximum intensity $I_{max}$ calculated with the fourth threshold value S4 in order to determine a second cause of the voltage outage load-side from the circuit breaker 22, distinct from the first cause of the voltage outage load-side. More specifically, the second cause of voltage outage load-side from the circuit breaker 22, corresponds to the presence of a short-circuit current on the first conductor 12, and is detected if the maximum intensity $I_{max}$ is greater than the fourth threshold value S4.

If, after the voltage outage load-side from the circuit breaker 22, the third S3 and the fourth S4 threshold values have not been exceeded by respectively the heating-up value θ and the maximum intensity $I_{max}$, while a third cause of the voltage outage load-side from the circuit breaker distinct from the first and second causes is detected. The third cause is a voltage drop and corresponds to manual opening of the circuit breaker 22 or to a drop or cut off of the voltage arriving on the input terminals 34, 36.

The third threshold value S3 is greater than the first threshold value S1 and than the second threshold value S2. The first threshold value S1 is greater than the second threshold value S2.

The message M1 comprises a first datum, STATUS, corresponding to the state of the circuit breaker 22, i.e. in the absence or a voltage loss load-side from the circuit breaker 22 or in the powered closed state of the circuit breaker, and a second DEFAULT datum corresponding to the cause of the voltage outage load-side from the circuit breaker. The cause of the voltage outage load-side from the circuit breaker 22 is preferably selected from the group consisting in: an electric overload, a short-circuit and a voltage drop.

The first STATUS datum is able to assume two different values, a first value ON and a second value OFF. The first value ON corresponding in the present case to the closed position of the powered circuit breaker 22 and the second value OFF corresponding to the voltage outage load-side from the circuit breaker 22.

When the determined cause of the voltage outage load-side from the circuit breaker 22 is a voltage drop, the cause of the voltage outage load-side in fact corresponds to manual opening, or to a cutoff or a drop of the voltage arriving on the input terminals 34, 36, to a value below the first reference voltage value.

Additionally, the message M1 comprises the intensity values of the current I and of the first voltage V1, as measured and calculated, as well as the associated energy and power values.

The operation of the electric system 10 according to the invention will now be explained by means of FIG. 3.

In the relevant example, the auxiliary unit 24 comprises a single current sensor 44 around the first conductor 12. Thus, in the method shown below, the cause of the voltage outage load-side from the circuit breaker 22 depends on the current crossing the first conductor 12 and the current crossing the second conductor 14 is not considered. Alternatively, and as this will be described subsequently, an additional current sensor is positioned around the second conductor 14.

During an initial step 100, the electric system 10 is connected onto the first 12 and second 14 electric conductors which are powered, i.e. crossed by a current in order to power the electric load 18.

Next, during a following step 102, the intensity of the current I and the first voltage V1 are regularly measured by the current 44 and voltage 46 sensors.

During a subsequent step 104, the auxiliary unit 24, via the processor 58, calculates the electric energy and the power which cross the circuit breaker 22 from the values of the current I and of the first voltage V1 measured in step 102. During a step 106, the second communication member 53 periodically sends a second message M2 with a predetermined period P. The second message M2 comprises the current I and first voltage V1 measured values, as well as the calculated energy and electric power and the first STATUS datum either corresponding to the voltage outage load-side from the circuit breaker 22, or to the powered closed state of the circuit breaker 22. Next, during a step 108, the first calculation software package 62, calculates the heating-up value θ from the values of the measured intensities of the current I.

During step 108, in order to calculate the heating-up value θ, the first calculation software package 62 calculates the square of the value of the measured intensity of the current I. Then, the square of the value of the intensity of the current I is filtered by means of a low pass filter of the RC type. The first calculation software package 62, applies the following filtering equation according to a sample index N of the measured current I: $\theta_N = \theta_{N-1} \times A + I_N \times I_N \times B$ with: A+B=1 and A and B being value coefficients comprised between 0 and 1. The last value $\theta_N$ of the calculated heating-up θ is then used for the steps which are subsequent to the calculation step 108.

Figure 4:
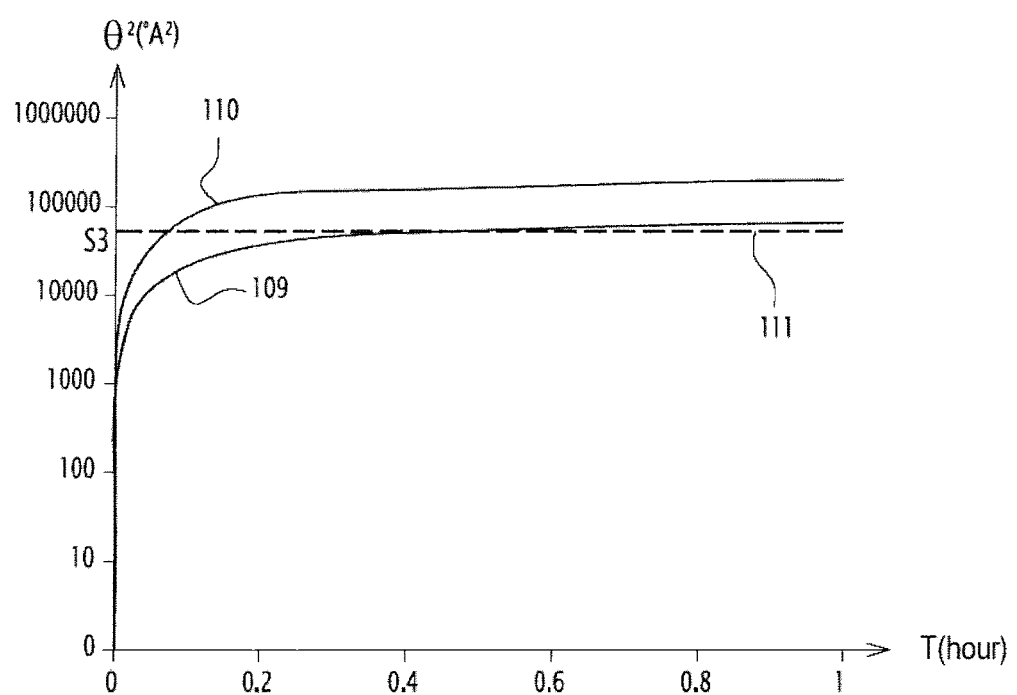
FIG. 4 is a set of two curves illustrating the heating-up calculated by the auxiliary unit, versus time, for two different values of the intensity of a current crossing an electric conductor to which is connected the circuit breaker of FIG. 1.

The selection of the coefficients A and B depend on the sampling frequency of the current I measured by the current sensor 44, and on a time constant corresponding to an elapsed time. The elapsed time is the time required for a predetermined intensity of the current I to flow through the electric conductor 12, before the detection means 59 detects an overload and triggers the opening of the circuit breaker 22. The thereby calculated heating-up value θ gives the possibility of modelling the thermal triggering curve of the circuit breaker 22. It is possible to adjust the values of A and B so that the simulated triggering curve corresponds to the time constant shown above. The coefficients A and B also depend on the physical characteristics of the second detection means. In FIG. 4, a first curve 109 illustrates the time-dependent change in the heating-up value θ, versus time, for a current measured by the current sensor 44, the value of which is equal to 1.3 times a rated value In of the current able to cross the circuit breaker 22. A second curve 110 illustrates the time-dependent change in the heating-up value θ, versus time, for a current measured by the current sensor 44, the value of which is equal to twice the rated value of the current In. It is thus observed that the higher the measured current, the more rapidly increases the value of the heating-up θ, and the faster it exceeds the third threshold value S3 illustrated by a horizontal line 111.

During step 112, the first comparison software package 65 compares the calculated heating-up value θ with the first threshold value S1.

If the calculated heating-up value A is less than the first threshold value S1, then the second calculation software package 64 calculates during a step 114, the maximum value $I_{max}$ of the intensity measured during the lapse of time T1, i.e. from the measured values of the current I during the lapse of time T1 preceding the calculation step 114. The time lapse T1 is preferably comprised between 60 milliseconds (ms) and 160 ms.

If the calculated heating-up value θ is greater than the first threshold value S1, then the processing unit 48 carries out a step 116 during which it generates an alarm signal which it transmits to the second communication number 53, which subsequently transmits the alarm signal to the concentrator 20.

Figure 3:
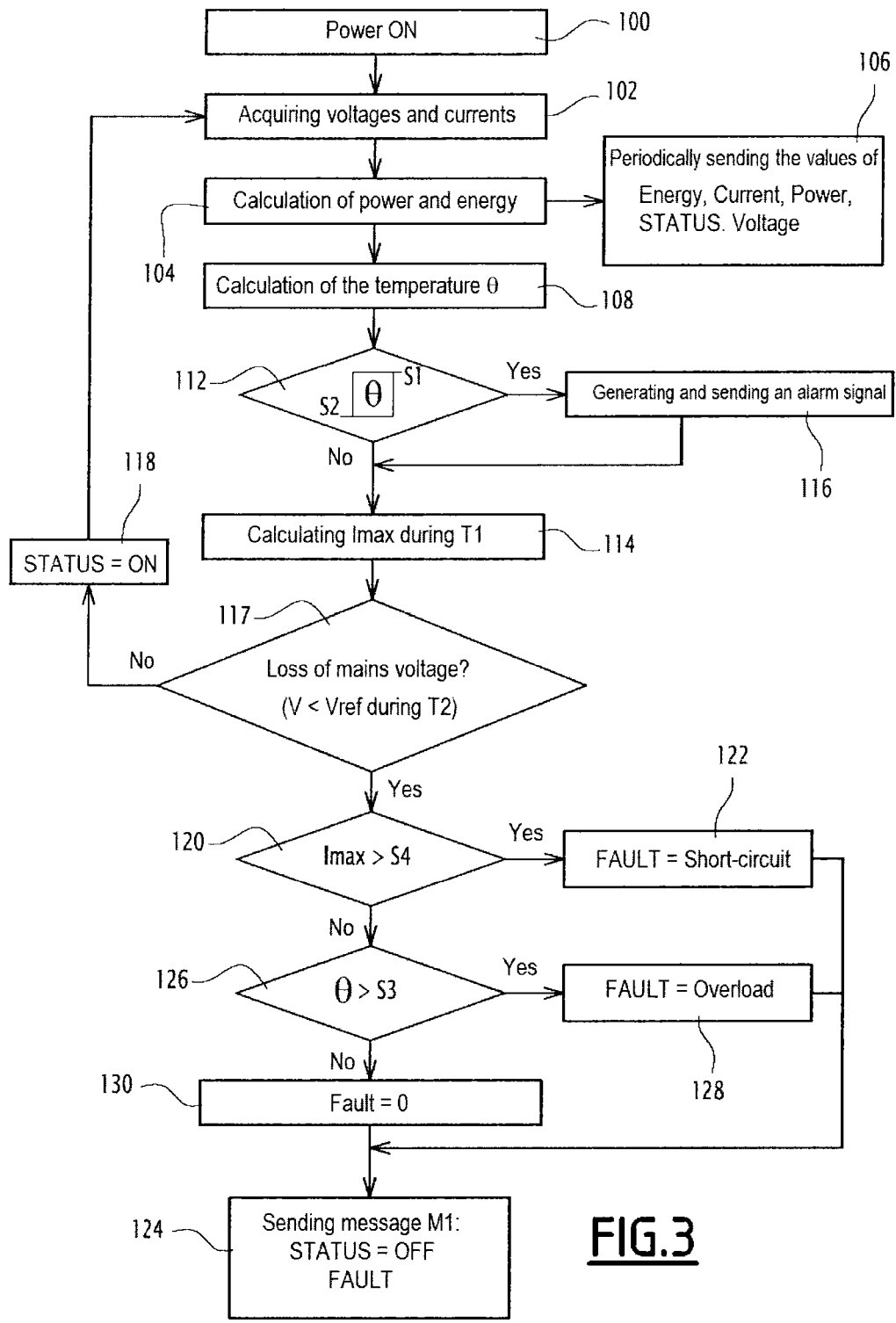
FIG. 3 is a flowchart of a method for determining a cause of voltage outage load-side from the circuit breaker of FIG. 1 according to the invention.

Additionally, and as illustrated in FIG. 3 by the use of the following symbol:

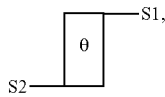

during step 112, the first comparison software package 65 also compares the heating-up value θ calculated with the second threshold value S2. The alarm signal is generated and sent from the moment when the heating-up value θ is greater than the first threshold value S1 and as long as the value of the heating-up θ is greater than the second threshold value S2. Thus we have a hysteresis operation during step 112 with the second threshold value S2 preferably comprised between 80% and 95% of the first threshold value S1. Next, subsequent to step 116, the processing unit 48 carries out step 114.

Alternatively, the steps 112 and 116 are carried out in parallel with the method for determining the cause of the voltage outage load-side from the circuit breaker 22. More specifically, in this alternative, following step 108, one directly passes to step 114, and steps 112 and 116 are carried out repeatedly, according to a predetermined repetition period.

Next, during a step 117, the first detection means 59 detects the voltage outage load-side from the electric circuit breaker 22 from the first voltage V1 values measured by the voltage sensor 46. More specifically, the first detection means 59 detects the voltage outage load-side from the circuit breaker if the first voltage V1 measured by the voltage sensor 46 is less than the second reference voltage value Vref during the time interval T2. The time interval T2 is preferably comprised between 5 ms and 10 ms.

In an alternative not shown, during step 117, the first detection means 59 detects the voltage outage load-side from the electric circuit breaker 22 by measuring the ripple of the voltage measured by the voltage sensor 46. In order to measure the ripple, the first detection means 59 calculates a derivative of the measured voltage and if the derivative calculated by the first detection means 59 is less than the reference value, for example comprised between 1% and 10% of the rated voltage of the circuit breakers 22, during the predetermined reference time T3, the first detection means 59 detects the voltage outage load-side from the circuit breaker 22.

If the first detection means 59 detects that the circuit breaker 22 is in a closed position with power on, then the first STATUS datum assumes, during step 118, the first value ON, and the processing unit 48 returns to step 102.

If the first detection means 59 detects the voltage outage load-side from the circuit breaker 22, then the processing unit 48 carries out a following step 120 during which the third comparison software package 76 compares the calculated maximum intensity $I_{max}$, during step 112, with the fourth threshold value S4 in order to detect the second cause of the voltage outage load-side from the circuit breaker 22.

If the calculated maximum intensity $I_{max}$ is greater than the fourth threshold value S4, then during a step 122, the processing unit 48 sets the second DEFAULT datum to the short-circuit value. The detected cause of the voltage outage load-side from the circuit breaker 22 is then the presence of a short-circuit current in the first conductor 12. Subsequently to step 122, the processing unit 48 carries out a step 124 during which the second communication member 53 transmits to the concentrator 20 at least the first STATUS datum and the second DEFAULT datum, so that an operator is able to identify from the viewing device 27, the cause of the voltage outage load-side from the circuit breaker 22.

If the calculated maximum intensity $I_{max}$ is less than the fourth threshold value S4, during step 120, then, during step 126 the second comparison software package 74 compares the calculated heating-up value θ in step 108 with the third threshold value S3 in order to detect the first cause of the voltage outage load-side from the circuit breaker 22. If the calculated heating-up value A is greater than the third threshold value S3, then the processing unit 48 sets during step 128, the second DEFAULT datum to the overload value, and the identified fault having caused the voltage outage load-side from the circuit breaker is an electric overload on the first conductor 12. Subsequently to step 128, the processing unit 48 completes the step 124 via the communication member.

In the case when the last calculated heating-up value θ is less than the third threshold value S3, then the processing unit 48 carries out a step 130 during which it sets the second DEFAULT datum to the value θ, which corresponds to manual opening of the second mechanical member 32 or to a cutoff of the voltage arriving on the first and second input terminals 34, 36.

Next, subsequently to step 130, the processing unit 48 carries out step 124.

Additionally, in the case of an electric installation equipped with a plurality of electric systems 10 and therefore with a plurality of auxiliary units 24, each auxiliary unit 24 proceeds in step 124 in three distinct random instants with increasing the probabilities of receiving the first messages M1 sent towards the concentrator 20.

The time interval T2 is preferably comprised between 5 ms and 10 ms, so that the processing unit 48 has sufficient time for detecting the short-circuit and for transmitting the message M1 produced in step 124. Further, by having a short time interval T2, it is possible to detect the microcuts of the mains 16 and thereby to measure the quality of the voltage provided by an electric power distributor who manages the mains 16.

By means of the invention, an operator is aware of the cause of the voltage outage load-side from the circuit breaker and decides what repair actions should be carried out depending on this cause.

The alarm signal gives the possibility of informing an operator that the electric load 18 is high, for example of the order of 80% of a maximum load acceptable by the circuit breaker 22, and if the load is increased, the circuit breaker 22 risks switching to the open position. Further, by using two distinct threshold values S1, S2, it is possible to avoid untimely switchings between the transmission of an alarm signal and the stopping of this transmission, and vice versa.

When the current sensor 44 is a linear sensor, such as a Rogowski torus, a shunt or any other means, the measurement dynamics are better, which allows an improvement in the determination of the cause of the detected triggering.

Further, the auxiliary unit 24 according to the invention is electrically and mechanically coupled with the circuit breaker 22 without modifying the latter. It is thus easier to install the auxiliary unit 24 on existing circuit breakers.

The lapse of time T1, during which the maximum intensity $I_{max}$ is calculated, is comprised between 60 ms and 160 ms so that, in the case when the electric load 18 is a motor maintaining a back electromotive voltage after opening the circuit breaker 22 causing cutoff of the voltage on the conductors 12, 14, the lapse of time T1 is sufficiently long so that the peak of the measured current I, due to the short-circuit, is detected.

Figure 5:
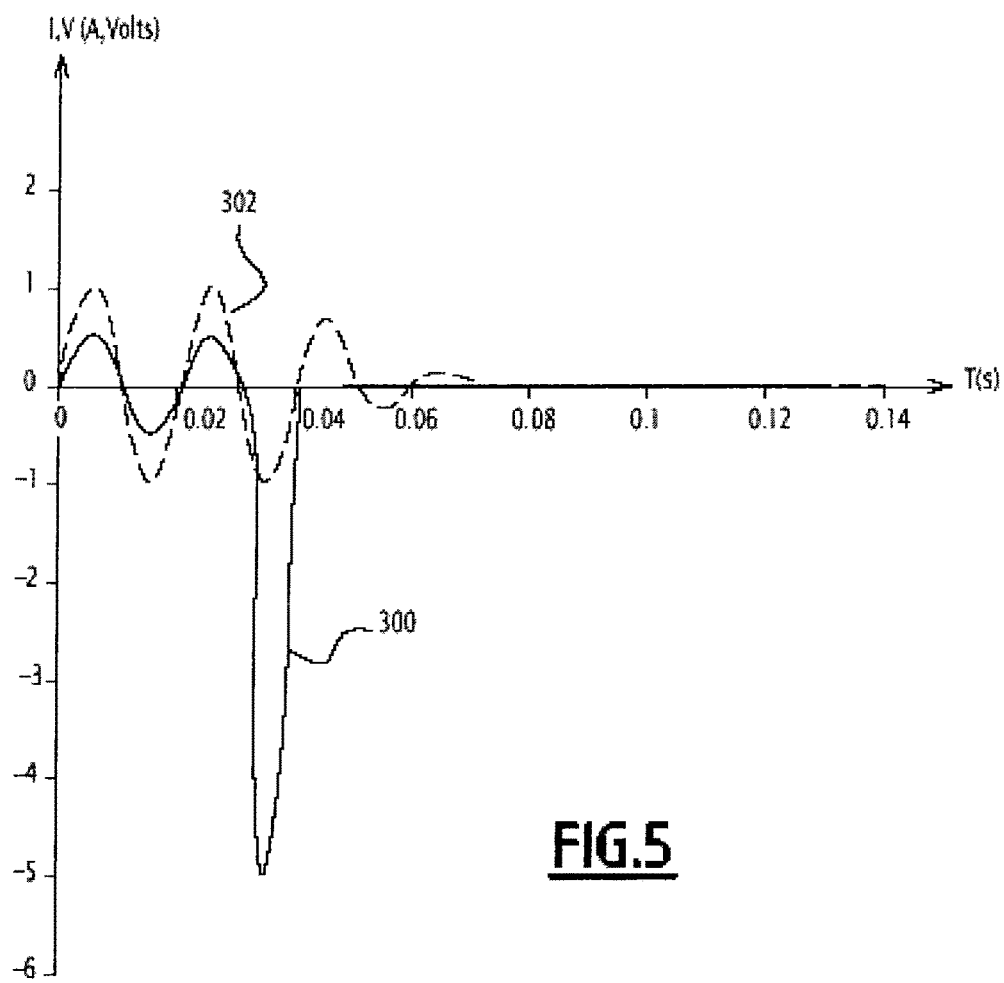
FIG. 5 is a set of two curves illustrating, during the opening of the circuit breaker of FIG. 1, a current crossing an electric conductor to which is connected the circuit breaker, versus time, on the one hand and a voltage measured at the output of the circuit breaker on an electric conductor, versus time, on the other hand.

In FIG. 5, a third curve 300 is observed, corresponding to the current crossing the circuit breaker 22 versus time, and a fourth curve 302 illustrating the voltage between the output terminals 38, 40 of the circuit breaker 22. On curve 300, an intensity peak is observed, corresponding to a short-circuit.

When the current I has zero intensity, then the circuit breaker 22 is open. However, it appears on curve 302 that when the circuit breaker 22 is opened and when the current is zero, i.e. for a period of 0.04 second(s), the voltage is not zero and gradually decreases after opening the circuit breaker 22. The measured voltage is not zero because of the back electromotive force generated by the load 18 of the motor type. Thus, during the cutoff produced by the circuit breaker 22, the first voltage V1 measured between the output terminals 38, 40 does not disappear instantaneously. The first voltage V1 is maintained to a non-zero value by the back electromotive voltage of the load 18 of the motor type for a certain period of the order of 60 ms. The first detection means 59 therefore detects the opening of the circuit breaker 22 at a time of more than 0.04 s. It is therefore necessary, in order to calculate the maximum intensity $I_{max}$, value after opening the circuit breaker 22, to calculate the maximum intensity $I_{max}$ for a period comprised between 60 ms and 160 ms so as to properly detect the current peak corresponding to the maximum intensity which occurs during a short-circuit. If the lapse of time T1 has a too small value, then, during step 117, the loss of the voltage from the mains will be detected, the value $I_{max}$ calculated in step 112 will not correspond to the short-circuit current.

Moreover, during step 117, the value of the first relevant voltage V1 in order to make a comparison, is measured between the first conductor 12 and the second conductor 14. This allows quasi-immediate detection of the voltage drop and therefore of the voltage outage load-side from the circuit breaker 22. The time interval T2 is therefore comprised between 5 ms and 10 ms in order to have optimum compromise between the rapidity of the detection of the voltage drop load-side from the circuit breaker 22 and to make a distinction with the microcuts of the voltage delivered by the mains 16.

Figure 6:
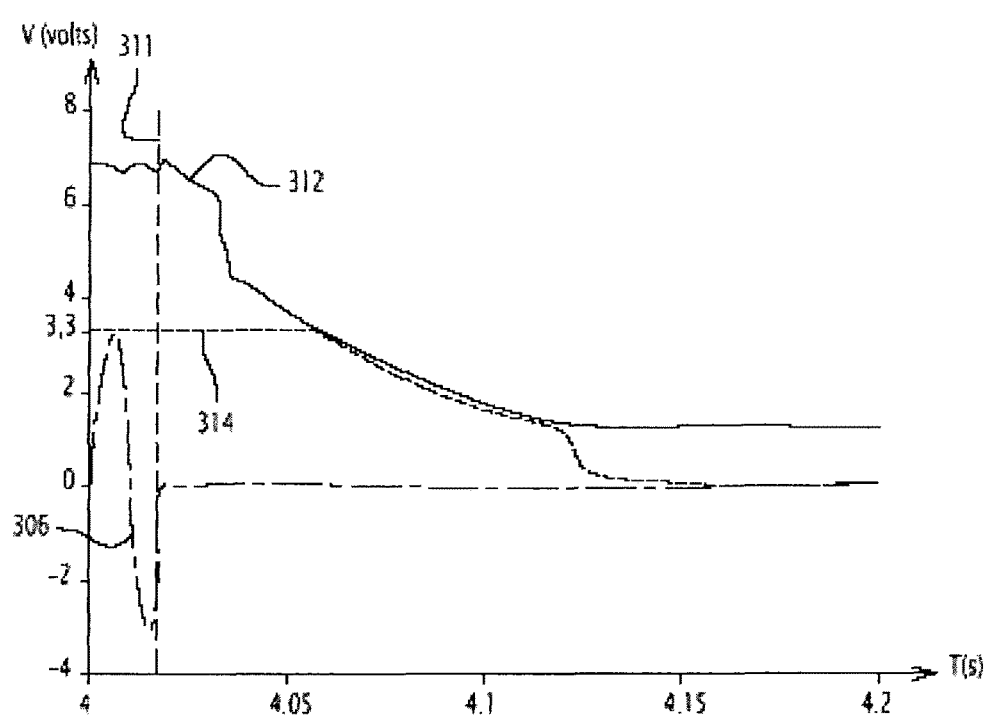
FIG. 6 is a set of three curves illustrating, versus time, and at the moment of the voltage outage load-side from the circuit breaker of FIG. 1, the voltage measured in three different measurement points within the auxiliary unit of FIG. 2.

The shape of the first voltage V1 is illustrated in FIG. 6 by a fifth curve 306 in dash lines. The first voltage V1 assumes the value zero as soon as the circuit breaker 22 is opened, illustrated by a first vertical line 311, illustrated in dotted lines.

Alternatively, in order to carry out step 117, the second reference voltage is compared with a second voltage V2 measured on the terminals of the storage member 52 as shown in FIG. 2. The second voltage V2 is illustrated in FIG. 6 by a sixth curve 312. However, in this alternative, an additional digital/analog input is required, which generates overcost in the selection of the processor 58.

In another alternative, in order to carry out step 117, the second reference voltage Vref is compared with a third voltage V3 measured at the output of the regulator 51 and powering the processing unit 48. The third voltage V3 is illustrated in FIG. 6 by a seventh curve 314. Being aware that the auxiliary unit 24 comprises a storage member 52, the time for detecting the drop of the voltage V3 is long, for example of the order of 40 to 50 ms since it depends on the discharge time of the storage member 52.

By means of the invention, it is possible to determine the cause of the voltage outage load-side from the circuit breaker 22 in a reliable way by means of the current sensor 44 and of the processing of the measured current I values. Thus, by measuring the current I, the determination application 66 is able to determine whether the voltage outage load-side from the circuit breaker 22 is due to a short-circuit current crossing the conductor 12, or due to an overload current crossing the conductor 12, or further to manual opening or to a cutoff or drop of the voltage on the input terminals 34, 36 of the circuit breaker 22.

In the alternative shown earlier where the auxiliary unit 24 comprises an additional current sensor able to measure the current crossing the second conductor 14, the auxiliary unit is able to determine the cause of the voltage outage load-side from the circuit breaker according to the currents each crossing the electric conductors 12, 14. In this alternative, the current values measured by each current sensor are processed separately and the method for determining the voltage outage load-side from the circuit breaker 22 is globally the same as the one shown earlier, with the difference that this method is executed for each electric conductor 12, 14. Next, the concentrator 20 is able to determine the cause of the voltage outage load-side from the circuit breaker and on which electric conductor 12, 14, an electric fault has occurred in the case when the cause of the voltage outage load-side is an overload or a short-circuit.

Alternatively, the circuit breaker is associated with a differential triggering means and the differential current sensor allows measurement of the leakage rate of the circuit breaker 22 and transmission of an alarm to the data concentrator 20 in the case of a risk of differential triggering of the differential triggering means. In the same way, the differential current sensor gives the possibility of determining whether the triggering was controlled by the differential trigger.

Figure 7:
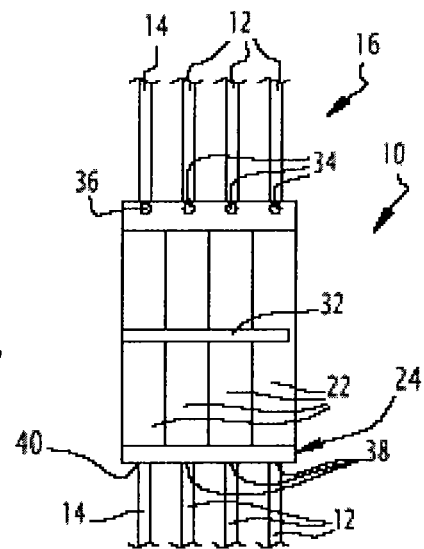
FIG. 7 is a schematic illustration of an electric system according to a second embodiment of the invention, com-

FIG. 7 illustrates a second embodiment of the invention for which the elements similar to the first embodiment, described earlier, are marked with identical references and are not described again.

According to the second embodiment, the current flowing in the electric connection 16 is a three-phase current, and the electric link 16 includes three phase electric conductors 12 and a neutral electric conductor 14.

The electric system 10 then includes four circuit breakers 22, forming a tetrapolar circuit breaker, coupled with the auxiliary unit 20.

The auxiliary unit 20 then includes three phase current sensors 44, each phase current sensor 44 being associated with a respective phase conductor 12.

The determination application 66 is then able to determine the cause of the voltage outage load-side from the circuit breaker, detected on one of the four poles of the circuit breaker 22 depending on each of the intensities measured by the phase current sensor 44.

The operation of the second embodiment for each phase conductor 12 is similar to that of the first embodiment described for a single phase conductor 12, and is not described again.

The advantages of this second embodiment are identical with those of the first embodiment.

More generally, the invention applies both to a single phase circuit breaker able to be connected to a phase conductor and to a neutral conductor as shown in the first embodiment, and to a three-phase circuit breaker able to be connected to the three-phase conductors, or even a tetrapolar circuit breaker connected to three-phase conductors and a neutral conductor, as shown in the second embodiment. For single phase and tetrapolar circuit breakers, upon opening of the circuit breaker, depending on the relevant application, the neutral conductor is cut off and the current crossing it is interrupted, or else the neutral conductor is not cut off and the current crossing it is not interrupted.

The invention claimed is:

1. A method for determining a cause of a voltage outage load-side from a circuit breaker by an auxiliary unit, the voltage outage load-side corresponding to an opening of the circuit breaker or to a voltage drop at the input of the circuit breaker below a first reference voltage value, the circuit breaker being in an open position able to interrupt flow of an electric current in an electric connection including at least one electric conductor, the auxiliary unit comprising at least one current sensor configured to measure intensity of the current flowing in a respective electric conductor and a first detector configured to detect the voltage outage load-side from the circuit breaker, the method comprising the following steps:
a) measuring, with said current sensor, the intensity of the current flowing in said or each electric conductor;
a2) calculating, depending on the intensity or intensities measured in step a), a value of a heating-up of a second detector of an electric overload, the second detector being comprised in the circuit breaker;
a3) calculating, with the auxiliary unit, a maximum value of the intensities measured during a predetermined lapse of time;
b) detecting, via the first detector, the voltage outage load-side from the electric circuit breaker; and
c) determining a cause of a detected voltage outage load-side from the circuit breaker, with the auxiliary unit and depending on
the intensity or intensities measured by said current sensor,
a first threshold value set to a heating-up value of the second detector corresponding to a current comprised between 100% and 120% of a rated current of the circuit breaker, and
a second threshold value comprised between 3 and 10 times the rated current of the circuit breaker,
the determining step including comparing the maximum value of the intensities measured with the second threshold value and, when the calculated maximum value of the intensities measured is lower than the second threshold value, a second cause of the voltage outage load-side from the circuit breaker corresponding to a short-circuit is determined, whereas otherwise the calculated heating-up value is compared with the first threshold value, and a first cause of the voltage outage corresponding to an electric overload is determined when the calculated heating-up value is higher than the first threshold value, while otherwise a third cause of the voltage outage corresponding to a manual opening of the circuit breaker and/or to a drop/cut off of a voltage arriving on input terminals of the circuit breaker is determined.

2. The method according to claim 1, wherein subsequently to step a2), the auxiliary unit carries out the following steps:
a3) comparing the value of the heating-up calculated with a third threshold value; and
a4) generating an alarm signal when the value of the calculated value of the heating-up is greater than the third threshold value.

3. The method according to claim 2, wherein
the first threshold value is greater than the third threshold value.

4. The method according to claim 1, wherein subsequently to step a2), the auxiliary unit carries out the following steps:

a3') comparing the value of the heating-up calculated with a third threshold value and with a fourth threshold value, less than the third threshold value; and
a4') generating an alarm signal from a moment when the calculated value of the heating-up is greater than the third threshold value and as long as the calculated value of the heating-up is greater than the fourth threshold value.

5. The method according to claim 1, wherein subsequently to the determining step c), the auxiliary unit carries out the following step:
d) transmitting a message containing a first datum corresponding to the presence of a voltage load-side from the circuit breaker and a second datum corresponding to the cause of the voltage outage load-side from the circuit breaker, to a concentrator.

6. An auxiliary unit for an electric circuit breaker, the circuit breaker being, in an open position, capable of interrupting flow of an electric current in an electric connection including at least one electric conductor, the circuit breaker comprising at least a second detector configured to detect an electric overload, the auxiliary unit comprising:
at least one current sensor configured to measure intensity of the current flowing in a respective electric conductor;
a first detector configured to detect a voltage outage load-side from the circuit breaker, the voltage outage load-side corresponding to an opening of the circuit breaker or to a voltage drop at the input of the circuit breaker below a first reference voltage value;
a first calculator configured to calculate a heating-up value of the second detector, depending on the intensity measured by said current sensor;
a second calculator configured to calculate a maximum value of intensities measured during a predetermined lapse of time; and
a determining device configured to determine a cause of the voltage outage load-side from the circuit breaker, depending on
the intensity or intensities measured by the current sensor,
a first threshold value set to a heating-up value of the second detector corresponding to a current comprised between 100% and 120% of a rated current of the circuit breaker, and
a second threshold value comprised between 3 and 10 times a rated current of the circuit breaker,
the determining device being configured to compare the maximum value of the intensities measured with the second threshold value and, when the calculated maximum value of the intensities measured is lower than the second threshold value, a second cause of the voltage outage load-side from the circuit breaker corresponding to a short-circuit is determined, whereas otherwise the calculated heating-up value is compared with the first threshold value, and a first cause of the voltage outage corresponding to an electric overload is determined when the calculated heating-up value is higher than the first threshold value, while otherwise a third cause of the voltage outage corresponding to a manual opening of the circuit breaker and/or to a drop/cut off of a voltage arriving on input terminals of the circuit breaker is determined.

7. The auxiliary unit according to claim 6, the circuit breaker including an input terminal for the current and an output terminal for the current for each electric conductor, wherein the first detector comprises at least one voltage sensor configured to measure the voltage delivered to a respective output terminal of the circuit breaker, and the first detector is configured to detect the voltage outage load-side from the circuit breaker in response to the voltage measured by the voltage sensor being less than a second reference voltage value during a predetermined time interval.

8. The auxiliary unit according to claim 7, further comprising:
- a third calculator configured to calculate an electric power and an electric energy crossing each corresponding conductor from the intensity and voltage values respectively measured by said current sensor and said voltage sensor; and
- a communication member configured to transmit the intensity and voltage measured values and the calculated energy and power values to a concentrator.

9. The auxiliary unit according to claim 6, the circuit breaker including an input terminal for the current and an output terminal for the current for each electric conductor, wherein the first detector comprises at least one voltage sensor configured to measure the voltage delivered to a respective output terminal of the circuit breaker, and the first detector is configured to calculate a derivative of the measured voltage and to detect the voltage outage load-side from the circuit breaker in response to the derivative calculated by the first detector being less than a reference value during a predetermined reference time.

10. An electric system comprising:
- an electric circuit breaker; and
- the auxiliary unit of claim 6 electrically coupled with the electric circuit breaker, the electric circuit breaker being in the open position, and configured to interrupt the flow of electric current in an electric connection including at least one electric conductor.

* * * * *